(12) United States Patent
Popov et al.

(10) Patent No.: US 12,374,364 B1
(45) Date of Patent: Jul. 29, 2025

(54) DATA STORAGE DEVICE WITH COMBINED TRACK INTERFERENCE AND THERMAL DECAY REFRESH MONITOR

(71) Applicant: WESTERN DIGITAL TECHNOLOGIES, INC., San Jose, CA (US)

(72) Inventors: Zarko Popov, Mission Viejo, CA (US); Mao Nishiyama, Fujisawa (JP); Hitoshi Yoshida, Fujisawa (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 18/425,419

(22) Filed: Jan. 29, 2024

(51) Int. Cl.
*G11B 19/04* (2006.01)
*G11B 27/36* (2006.01)

(52) U.S. Cl.
CPC .......... *G11B 19/045* (2013.01); *G11B 19/046* (2013.01); *G11B 27/36* (2013.01)

(58) Field of Classification Search
None
See application file for complete search history.

(56) References Cited

U.S. PATENT DOCUMENTS

| | | | |
|---|---|---|---|
| 6,359,744 B1 | 3/2002 | Mallary | |
| 6,603,617 B1* | 8/2003 | Cross | G11B 5/09 360/68 |
| 6,947,234 B2 | 9/2005 | Lamberts et al. | |
| 7,738,206 B1 | 6/2010 | Lin et al. | |
| 8,429,343 B1* | 4/2013 | Tsai | G06F 12/0246 711/113 |
| 8,773,802 B1* | 7/2014 | Anderson | G11B 5/6029 360/75 |
| 8,917,467 B1 | 12/2014 | Xia et al. | |
| 8,941,935 B1* | 1/2015 | Aho | G11B 27/36 360/48 |
| 9,502,061 B1 | 11/2016 | Zhu et al. | |
| 9,620,162 B1* | 4/2017 | Haralson | G11B 5/012 |
| 11,276,431 B1 | 3/2022 | Popov et al. | |
| 11,694,717 B1 | 7/2023 | Popov et al. | |

(Continued)

OTHER PUBLICATIONS

Shi et al., "Correlation of ATI and SNR Decay in Magnetic Recording", https://ieeexplore.ieee.org/abstract/document/6332926, dated Nov. 2012; 4 Pages.

(Continued)

*Primary Examiner* — Peter Vincent Agustin
(74) *Attorney, Agent, or Firm* — Calderon Safran & Wright P.C.

(57) ABSTRACT

Various illustrative aspects are directed to a data storage device, method, and one or more processing devices that are configured to: maintain a refresh monitor for a refresh zone of one of the one or more disks, wherein the refresh zone comprises at least one data sector; update the refresh monitor in response to a write operation being performed in a track different than a track containing the refresh zone; update the refresh monitor at predefined time intervals based on a temperature of the one of the one or more disks or of the data storage device; and control a refresh operation of the refresh zone using the refresh monitor.

21 Claims, 4 Drawing Sheets

(56) References Cited

U.S. PATENT DOCUMENTS

| | | | |
|---|---|---|---|
| 2004/0268033 A1* | 12/2004 | Chia | G11B 19/04 |
| | | | 711/112 |
| 2005/0207049 A1* | 9/2005 | Ikeda | G11B 19/12 |
| 2008/0165443 A1 | 7/2008 | Moline | |
| 2022/0301588 A1* | 9/2022 | Popov | G11B 20/1037 |

OTHER PUBLICATIONS

Tanahashi et al., "Reduction of thermal decay in longitudinal recording media with a CoCr intermediate layer", https://www.sciencedirect.com/science/article/abs/pii/S0304885398004338, 1999; 5 Pages.

* cited by examiner

DATA STORAGE DEVICE WITH COMBINED TRACK INTERFERENCE AND THERMAL DECAY REFRESH MONITOR

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge 64) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine control actuators such as milliactuators or microactuators, in some examples.

SUMMARY

Various examples disclosed herein provide data storage devices such as hard disk drives with control circuitry configured to perform novel and inventive methods of refresh monitoring. In various examples, control circuitry of this disclosure is inventively configured to maintain a combined track interference and thermal decay refresh monitor and to control refresh operations using the refresh monitor.

Various illustrative aspects are directed to a data storage device, comprising one or more disks; an actuator mechanism configured to position one or more heads proximate to a corresponding disk surface of a corresponding disk of the one or more disks; and one or more processing devices. The one or more processing devices, individually or in combination, are configured to: maintain a refresh monitor for a refresh zone of one of the one or more disks, wherein the refresh zone comprises at least one data sector; update the refresh monitor in response to a write operation being performed in a track different than a track containing the refresh zone; update the refresh monitor at predefined time intervals based on a temperature of the one of the one or more disks; and control a refresh operation of the refresh zone using the refresh monitor.

Various illustrative aspects are directed to a method comprising: maintaining, by one or more processing devices individually or in combination, a refresh monitor for a refresh zone of a magnetic media of a disk drive, wherein the refresh zone comprises at least one data sector of at least one track of the magnetic media; determining, by the one or more processing devices individually or in combination, an amount of interference-based damage to data in the refresh zone based on a write operation; updating, by the one or more processing devices individually or in combination, a counter of the refresh monitor based on the amount of interference-based damage; determining, by the one or more processing devices individually or in combination, an amount of thermal-based damage to the data in the refresh zone based on a temperature of the magnetic media for a period of time; updating, by the one or more processing devices individually or in combination, the counter of the refresh monitor based on the amount of thermal-based damage; and executing, by the one or more processing devices individually or in combination, a refresh operation on the data in the refresh zone in response to a value of the counter exceeding a threshold value.

Various illustrative aspects are directed to one or more processing devices comprising: means for maintaining a refresh monitor for a refresh zone of one of the one or more disks, wherein the refresh zone comprises at least one data sector; means for updating the refresh monitor in response to a write operation being performed in a track different than a track containing the refresh zone; means for updating the refresh monitor at predefined time intervals based on a temperature of the one of the one or more disks; and means for performing a refresh operation of the refresh zone in response to a value of the counter exceeding a threshold value.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

DETAILED DESCRIPTION

Figure 1:
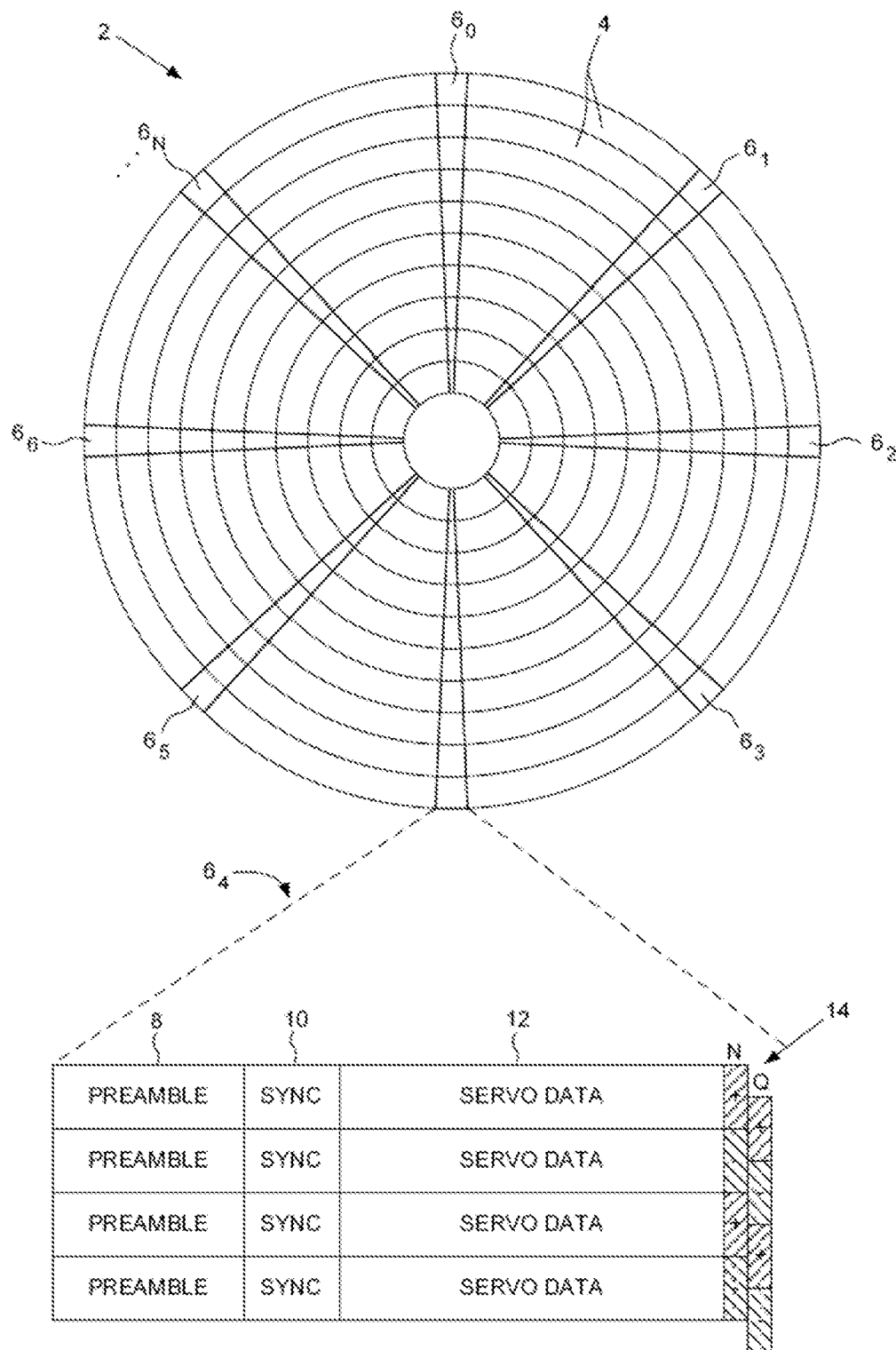
FIG. 1 shows a prior art disk format as comprising a number of radially-spaced, concentric servo tracks defined by servo wedges recorded around the circumference of each servo track.
Figure 2:
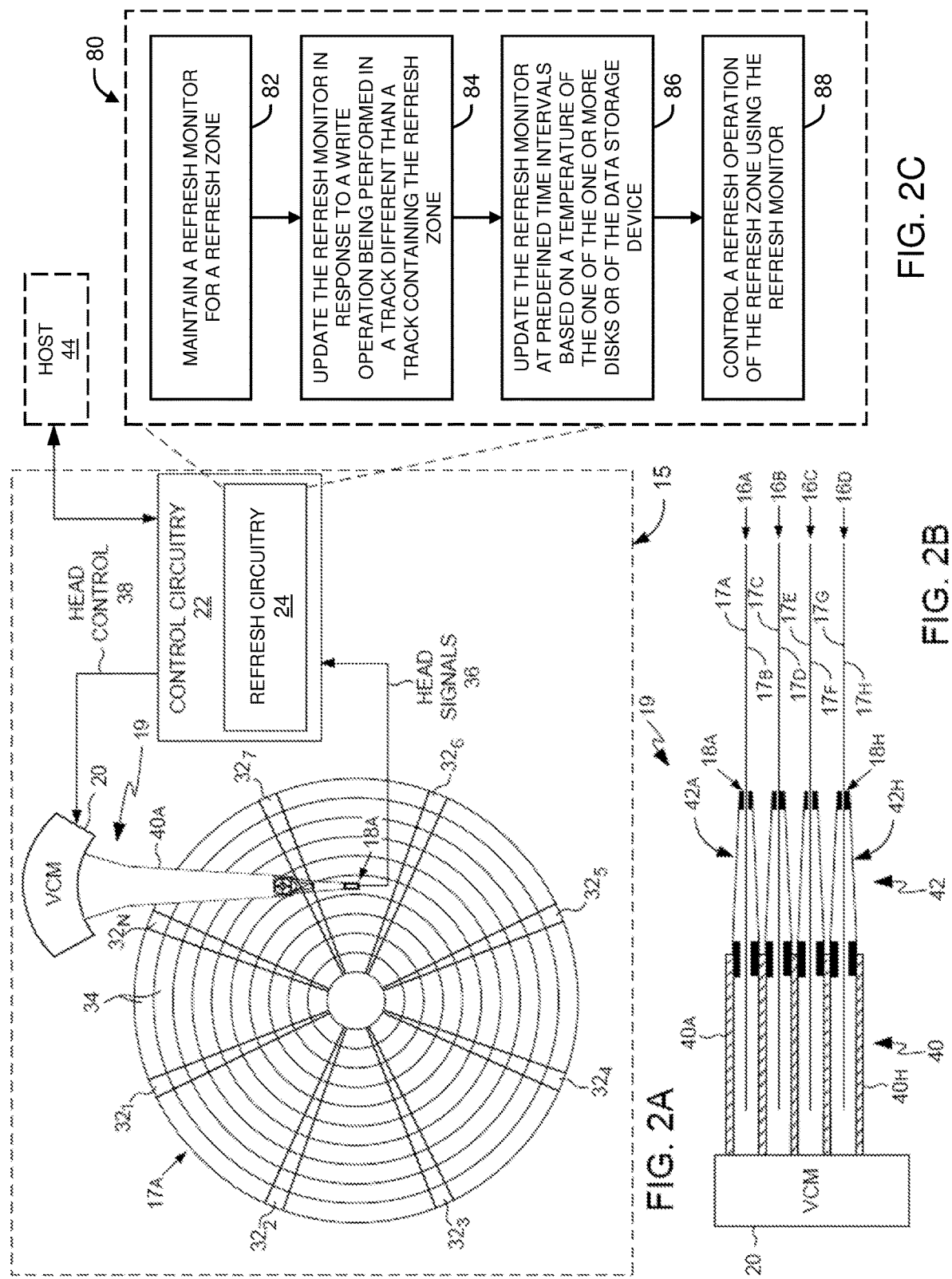
FIGS. 2A and 2B illustrate conceptual block diagrams of a top view and a side view of a data storage device in the form of a disk drive, in accordance with aspects of the present disclosure.
FIG. 2C depicts a flowchart for an example method that read/write channel circuitry of control circuitry of a disk drive may perform or execute in controlling the operations of the disk drive, in accordance with aspects of the present disclosure.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). FIG. 2C depicts a flowchart for an example method 80 that refresh circuitry 24 of control circuitry 22 may perform or execute in controlling the operations of disk drive 15, in accordance with aspects of the present disclosure, including maintaining a combined track interference and thermal decay refresh monitor and controlling refresh operations using the refresh monitor.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional fine actuators, in some examples.

Each of actuator arms 40 is configured to suspend a read/write head 18 in close proximity over a corresponding disk surface 17 (e.g., read/write head 18A suspended by topmost actuator arm 40A over topmost corresponding disk surface 17A, read/write head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one actuator in the form of VCM 20 in the example of FIGS. 2A and 2B, for example In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples. Control circuitry 22 may be operatively in communicative and/or control connection or coupling with a host 44, which may include any external processing, computing, and/or data management entity, such as a computing device, a storage area network, a data center, a cloud computing resource of any kind, and/or any other kind of host, in various examples.

Control circuitry 22 may comprise one or more processing devices that constitute device drivers, specially configured for driving and operating certain devices, and one or more modules. Such device drivers may comprise one or more head drivers, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of disks 16. The positions of heads 18, e.g., heads 18A and 18H, are indicated in FIG. 2A, although heads 18 are generally positioned very close to the disk surfaces, and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks, or ten or eleven or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17. As used herein, a head 18 may be said to operate "above" a corresponding disk surface 17 in terms that define the local frame of reference in accordance therewith.

The term "disk surface" may be understood to have the ordinary meaning it has to persons skilled in the applicable engineering fields of art. The term "disk surface" may be understood to comprise both the very outer surface layer of a disk as well as a volume of disk matter beneath the outer surface layer, which may be considered in terms of atomic depth, or (in a simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges 32$_1$-32N, which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate the servo wedges 321-32N and generate a position error signal (PES) representing an error between the actual position of the head and a target position relative to a target track. A servo control system in the control circuitry 22 filters the PES from the servo wedges using a suitable compensation filter to generate a control signal 38 applied to actuator arm assembly 19, including to control actuator 20, which functions as a primary actuator, and which rotates actuator arm assembly 19 about an axial pivot in order to perform primary actuation of the corresponding heads 18 radially over the disk surfaces 17 in a direction that reduces the PES, as well as to control any fine actuators, in various examples. Control circuitry 22 may also apply control signals to and receive sensor signals from heads 18 and/or any of various components of disk drive 15, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. In some examples, each of the two actuator arm assemblies may control half of the heads, and write to and read from half of the disk surfaces. In some examples, each of the actuator arm assemblies may be addressable by host 44 as a separate logical data storage unit. Other examples may employ more than two actuator arm assemblies or primary actuators or multi-actuators, which may be actuated about a common pivot, or which may be comprised in multiple multi-actuators mounted at different circumferential locations about the disks. Actuator arm assembly 19 and/or any of these other examples may thus constitute and/or comprise an actuator mechanism, in various examples. An actuator mechanism such as actuator arm assembly 19 may thus be configured to position heads 18, including a selected head among one or more heads 18, proximate to a corresponding disk surface 17 among the one or more disks 16.

In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15. In a particular example, refresh circuitry 24 of control circuitry 22 may maintain a refresh monitor for a refresh zone of one of the one or more disks 16, wherein the refresh zone comprises at least one data sector (82). Refresh circuitry 24 may further update the refresh monitor in response to a write operation being performed in a track different than a track containing the refresh zone (84). Refresh circuitry 24 may further update the refresh monitor at predefined time intervals based on a temperature of the one of the one or more disks 16 (86). Refresh circuitry 24 may further control a refresh operation of the refresh zone using the refresh monitor (88). Control circuitry 22, including refresh circuitry 24, may further perform additional actions, methods, and techniques, in accordance with various aspects including as further described herein.

The term "refresh circuitry 24" as used herein may refer to any hardware, firmware, software, and/or combination thereof, comprised in control circuitry 22 of disk drive 15, which implements, embodies, or engages in any of the structures or functions ascribed herein to refresh circuitry 24 or to any other of the novel and inventive aspects of the present disclosure. Refresh circuitry 24 may constitute any hardware, firmware, software, and/or any other elements of control circuitry 22 for maintaining a combined track interference and thermal decay refresh monitor and controlling refresh operations using the refresh monitor, and performing other techniques and methods as described herein.

In a magnetic disk drive, information is recorded by magnetizing magnetic particles of a magnetic disk. However, information stored magnetically on the magnetic disk has a property that it is degraded or lost with time. In the magnetic disk, information is recorded magnetically as bits by virtue of numerous magnetic particles called grains, which are magnetized by a magnetic field of a write head and maintained in a fixed direction. The grains have a plurality of stable states and are oriented in a specific stable direction by magnetization. However, even once the grains are magnetized in the specific direction by the magnetic field of the magnetic write head, the grains are affected by thermal energy and begin changing the orientation into other stable directions gradually and, in turn, affect adjacent grains so that more and more grains become oriented in the directions different from the initial direction upon the magnetization. As a result, the read signal may be degraded in terms of resolution and gain. This phenomenon is known as thermal decay.

In response to the increasing need to store large amounts of digital data in connection with computer systems, magnetic disk drives have utilized increased data storage densities. In order to support high data densities, magnetic disk drives are utilizing increasingly higher track densities and increasingly smaller grain sizes. However, the energy required to switch the magnetization of the material decreases as the grain size decreases. Accordingly, as the grain size of the magnetic material has decreased, the material has become more susceptible to data loss due to thermal decay.

Moreover, as track density has increased, the magnetic particles are more susceptible to being affected by the magnetic field generated when a write head writes data into nearby tracks. This phenomenon is called track interference. Therefore, if the information written on the magnetic disk is left in place for long periods of time, it may be degraded due to one or both of thermal decay and track interference, which may result in an inability of the head to read the data. Implementations of the present disclosure address this issue by providing novel methods and systems for refreshing data using a combined track interference and thermal decay refresh monitor.

Figure 3:
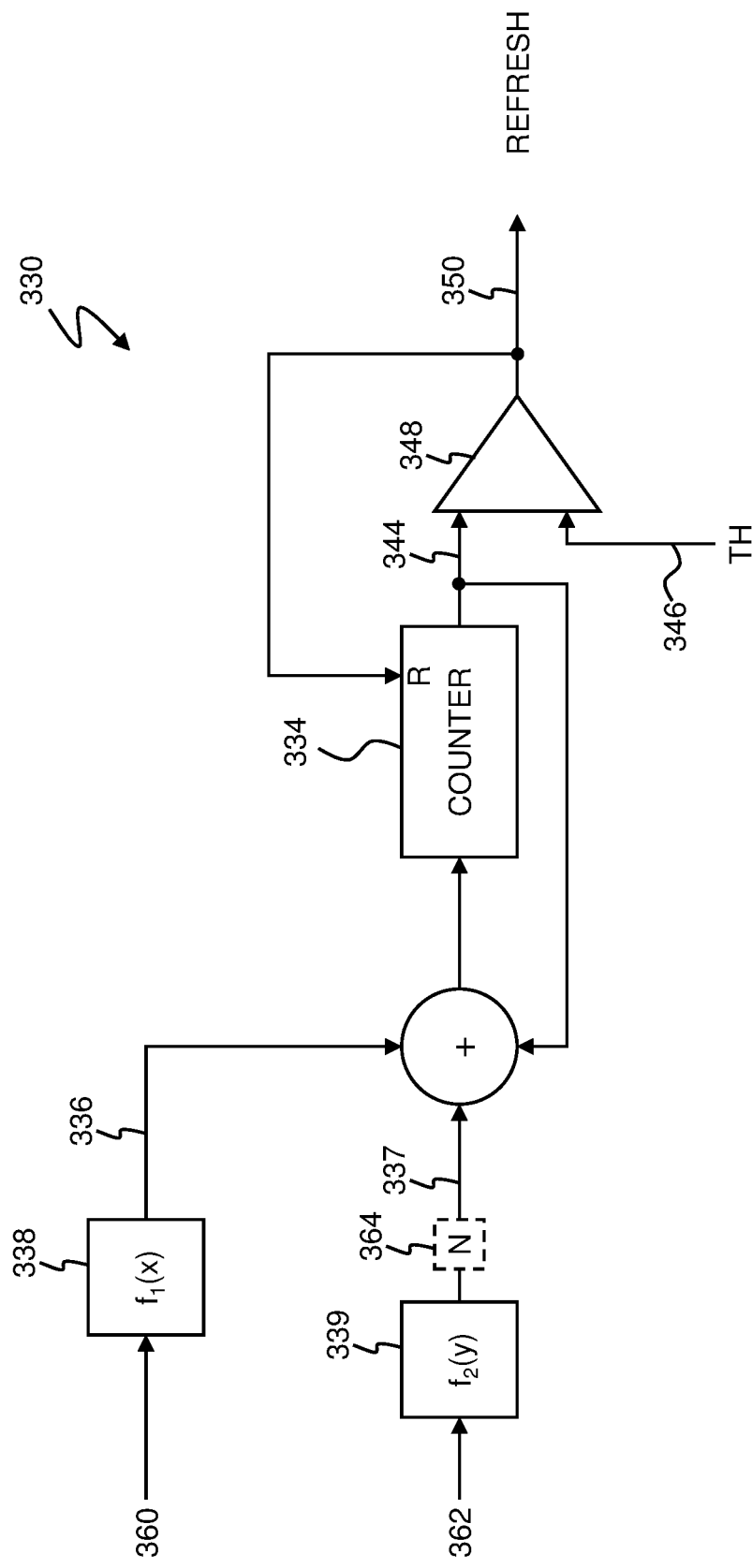
FIG. 3 shows an example refresh monitor in accordance with aspects of the present disclosure.

FIG. 3 shows an example refresh monitor 330 in accordance with aspects of the present disclosure. In embodiments, refresh monitor 330 comprises a counter 334 that represents a degree of data degradation within a corresponding refresh zone. Data degradation refers to degradation of the data stored on a disk such as one of disks 16 of FIG. 2B. At the beginning of a refresh interval, counter 334 is reset (e.g., to zero) and then adjusted during the refresh interval by one or both of a first update value 336 generated by a first update function 338 and a second update value 337 generated by a second update function 339. An output 344 of counter 334 is compared to a refresh threshold 346 at comparator 348 which asserts a refresh signal 350 when output 344 exceeds refresh threshold 346. Asserting refresh signal 350 causes control circuitry 22 of FIG. 2A to perform a refresh operation to refresh the data in the refresh zone associated with resource monitor 330. In one example, a refresh operation includes reading the data stored in the refresh zone and rewriting the data in the same location (i.e., the refresh zone) or at another location on the disk.

Refresh circuitry 24 of FIG. 2A may maintain refresh monitor 330 to monitor data degradation of any size refresh zone of a disk such as one of disks 16 of FIG. 2B. For example, a refresh zone may comprise one or more data sectors in a data track of a disk, an entire data track of the disk, or a band of data tracks of the disk. In embodiments, refresh circuitry 24 defines plural different refresh zones for a disk and maintains a different respective refresh monitor 330 for each respective one of the plural different refresh zones. In this manner, data in different refresh zones of the disk may be monitored and refreshed on an as-needed basis. FIG. 3 provides a general overview of a refresh monitor 330, whereas the actual implementation may comprise components other than a literal counter (e.g., using a general accumulator implemented in software or hardware). For example, the counter may comprise an analog circuit.

In embodiments, and with continued reference to FIG. 3, first update function 338 comprises an interference-based damage estimator function that is configured to estimate a degree of data degradation caused by track interference. Track interference involves write operations to one data track interfering with and damaging data stored in other data tracks, including adjacent, near, and far tracks, relative to a track being written. Interference at each of these distances may respectively be referred to as adjacent track interference (ATI), near track interference (NTI) and far track interference (FTI). Track interference integrated across all of these distances, or ATI, NTI, and FTI collectively, may be referred to as integrated track interference, or xTI (where "x" may stand for any distance category).

Figure 4:
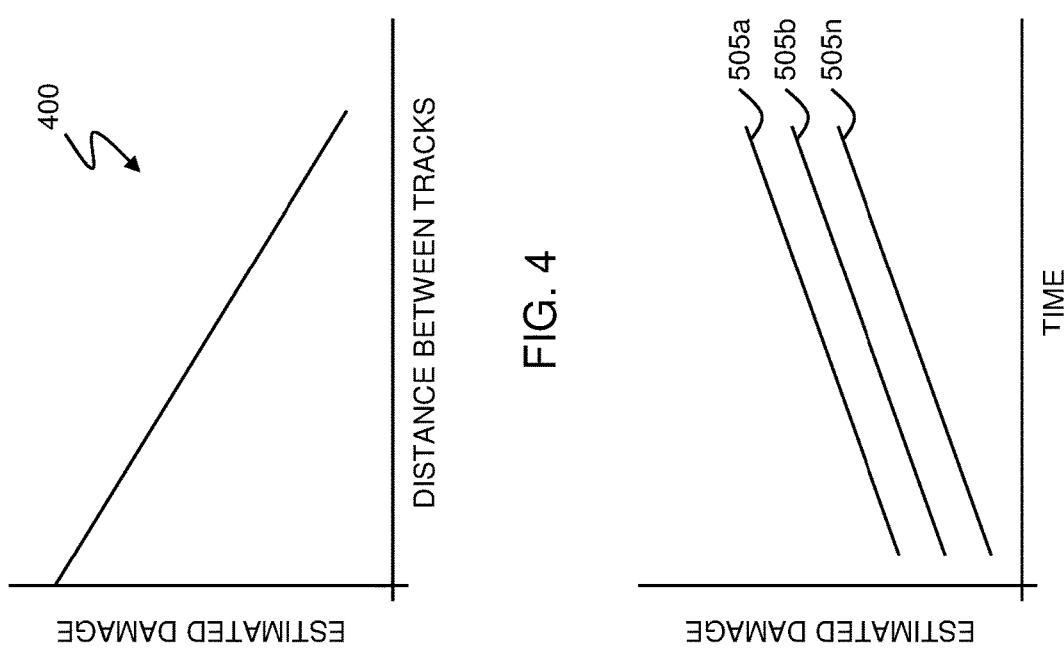
FIG. 4 shows an example of an interference-based damage estimator function in accordance with aspects of the present disclosure.

FIG. 4 shows an example of an interference-based damage estimator function 400 that may be used with first update function 338 of FIG. 3. In FIG. 4, the horizontal axis represents a distance between a victim track (i.e., a track suffering data degradation as a result of track interference) and an aggressor track (i.e., a track in which data is written). The vertical axis represents an amount of data degradation in the victim track caused by track interference when writing to the aggressor track. The scale of the vertical axis may be based on a metric employed to quantify data degradation at the time of a read operation, such a quality of a read signal (e.g., signal to noise ratio (SNR)), a number of bit errors detected by an error correction code, a depth of error recovery procedures needed to recovery the data, and a time needed to recover the data. The interference-based damage estimator function 400 thus defines a relationship between (i) a distance between a victim track and an aggressor track and (ii) an amount of damage in the victim track caused by track interference resulting from a write operation in the aggressor track. The exemplary interference-based damage estimator function 400 of FIG. 4 is shown as being a linear function; however, any type of function may be used, including but not limited to linear, polynomial, logarithmic, exponential, etc. First update value 336 may correspond directly to a value of the vertical axis interference-based damage estimator function 400 or may be a function (e.g., a multiple or fraction of) of a value of the vertical axis. Alternatively, the interference-based damage estimator function 400 may comprise one or more look up tables that define the noted relationship.

In embodiments, in response to a write operation being performed at a track that is within a predefined distance from a refresh zone, refresh circuitry 24 uses the interference-based damage estimator function 400 to determine a first update value 336 for the refresh zone based on how far away the refresh zone is from the track in which the write operation occurs. For example, a track ID of a track that is written to may be provided as input 360 to the first update function 338 as shown in FIG. 3. Refresh circuitry 24 then updates the counter 334 of the refresh monitor for this refresh zone by adding this first update value 336 to the current value (e.g., output 344) of the counter 334. In embodiments, refresh circuitry 24 performs this determining of first update value 336 and updating the counter 334 on an as-needed basis, i.e., in response to a write operation being performed within a predefined distance from the refresh zone. In one example, the predefined distance is measured in a predefined number of tracks. For example, the predefined distance may be N tracks (where N is an integer greater than zero), such that the refresh circuitry 24 would determine a first update value 336 and update counter 334 for a refresh zone in response to a write operation that occurred within N tracks to the left or N tracks to the right of the refresh zone.

In embodiments, and referring again to FIG. 3, second update function 339 comprises a thermal-based damage estimator function that is configured to estimate a degree of data degradation caused by thermal decay. As described herein, thermal decay involves the degradation of data on the disk due to time and temperature of the magnetic material.

Figure 5:
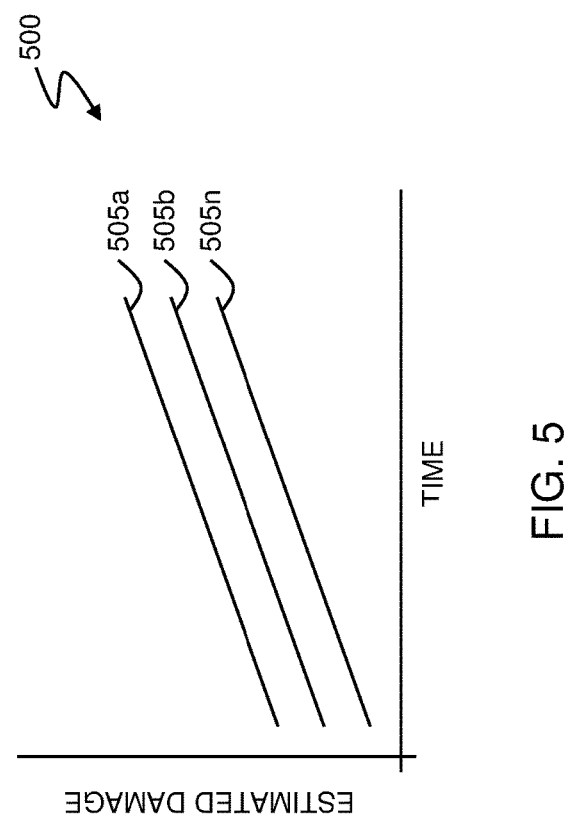
FIG. 5 shows an example of a thermal-based damage estimator function in accordance with aspects of the present disclosure.

FIG. 5 shows an example of a thermal-based damage estimator function 500 that may be used with the second update function 339 of FIG. 3. In FIG. 5, the horizontal axis represents time, and the vertical axis represents an amount of data degradation in the disk due to the disk being at a particular temperature for a particular amount of time. Curves 505a, 505b, . . . , 505n correspond to different temperatures of a disk. The scale of the vertical axis may be based on a metric employed to quantify data degradation at the time of a read operation, such a quality of a read signal (e.g., signal to noise ratio (SNR)), a number of bit errors detected by an error correction code, a depth of error recovery procedures needed to recovery the data, and a time needed to recover the data. The thermal-based damage estimator function 500 thus defines a relationship between (i) time, (ii) temperature, and (iii) an amount of thermal decay damage as a result of the disk being at a temperature for an amount of time. In the example of FIG. 5, the horizontal axis and the vertical axis both have a logarithmic scale, and the curves 505a-n are linear fittings of calibration data; however, any type of function may be used, including but not limited to linear, polynomial, logarithmic, exponential, etc.

In embodiments, second update value 337 may correspond directly to a value of the vertical axis of thermal-based damage estimator function 500 or may be a function of a value of the vertical axis. In both embodiments, a magnitude of second update value 337 is normalized relative to a magnitude of first update value 336, which permits the values 336 and 337 to be combined in a single counter (i.e., counter 334) of refresh monitor 330. In one example, refresh circuitry 24 determines second update value 337 by obtaining a value from the vertical axis of thermal-based damage estimator function 500 based on a time and a temperature, and by applying a normalization function 364 to the obtained value. In this example, the normalization function 364 normalizes a scale of the vertical axis of thermal-based damage estimator function 500 to a scale of the vertical axis of interference-based damage estimator function 400, so that an increment of damage indicated by thermal-based damage estimator function 500 corresponds in magnitude to an increment of damage indicated by interference-based damage estimator function 400. In another example, the scale of the vertical axis of thermal-based damage estimator function 500 is normalized to a scale of the vertical axis of interference-based damage estimator function 400, such that second update value 337 may correspond directly to a value of the vertical axis of thermal-based damage estimator function 500.

In accordance with aspects of the present disclosure, refresh circuitry 24 uses the thermal-based damage estimator function 500 to determine a second update value 337 for the refresh zone in a recurring manner at predefined time intervals. For example, once daily, refresh circuitry 24 may determine an average temperature of the disk for that day and determine a second update value 337 using this temperature and time period with thermal-based damage estimator function 500, e.g., by providing the temperature and time period as input 362 to the second update function 339 as shown in FIG. 3. Refresh circuitry 24 then updates counter 334 of the refresh monitor for this refresh zone by adding this second update value 337 to the current value of counter 334. Any desired time interval may be used, including but not limited to hourly, daily, weekly, etc. In one example, the temperature of the disk may be obtained using sensors that detect a temperature of the disk. In another example, the temperature of the disk may be equated to a temperature of the disk drive, such as an air temperature inside the disk drive.

In accordance with aspects of the present disclosure, control circuitry 22 performs a refresh operation of the data in a refresh zone when the current value of the counter 334 (e.g., output 344) exceeds refresh threshold 346. In embodiments, refresh circuitry 24 resets the counter 334 (e.g., to a value of zero or another starting value) in response to performing the refresh operation.

In further embodiments, refresh circuitry 24 resets the counter 334 in response to a non-refresh write operation being performed in the refresh zone. A non-refresh write operation may involve a write operation that overwrites previously written data in the refresh zone.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprise logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method. Steps of method 80, and other methods of this disclosure, may be performed individually or in combination by one or more processing devices. For example, in some implementations, the one or more processing devices may comprise a single processing device that performs all the steps of such a method. In some implementations, different respective ones of the one or more processing devices may perform different respective steps of such a method. For example, in some implementations, the one or more processing devices may comprise at least a first processing device that performs a first subset of the steps of such a method and at least a second processing device that performs a second subset of the steps of the method. In some implementations, one or more steps of such a method may be performed by two or more of the one or more processing devices acting in combination.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
one or more disks;
an actuator mechanism configured to position a selected head among one or more heads proximate to a corresponding disk surface of a corresponding disk among the one or more disks; and
one or more processing devices, individually or in combination, configured to:
 maintain a refresh monitor for a refresh zone of one of the one or more disks, wherein the refresh zone comprises at least one data sector;
 update the refresh monitor in response to a write operation being performed in a track different than a track containing the refresh zone;
 update the refresh monitor at predefined time intervals based on a temperature of the one of the one or more disks or of the data storage device; and
 control a refresh operation of the refresh zone using the refresh monitor.

2. The data storage device of claim 1, wherein:
the updating the refresh monitor in response to the write operation comprises updating the refresh monitor using a first damage estimator function; and
the updating the refresh monitor based on the temperature of the one of the one or more disks or of the data storage device comprises updating the refresh monitor using a second damage estimator function different than the first damage estimator function.

3. The data storage device of claim 2, wherein:
the first damage estimator function is configured to determine a first amount of damage to data in the refresh zone based on track interference generated by the write operation; and
the second damage estimator function is configured to determine a second amount of damage to the data in the refresh zone based on thermal decay.

4. The data storage device of claim 3, wherein the thermal decay is based on the temperature of the one of the one or more disks or of the data storage device during a respective one of the predefined time intervals.

5. The data storage device of claim 3, wherein the track interference comprises adjacent track interference, near track interference, or far track interference.

6. The data storage device of claim 3, wherein:
the updating the refresh monitor in response to the write operation comprises updating a counter based on the first amount of damage determined using the first damage estimator function; and
the updating the refresh monitor based on the temperature of the one or more disks comprises updating the counter based on the second amount of damage determined using the second damage estimator function.

7. The data storage device of claim 6, wherein the one or more processing devices, individually or in combination, are further configured to normalize a scale of the second amount of damage to a scale of the first amount of damage.

8. The data storage device of claim 6, wherein the controlling the refresh operation comprises executing a refresh operation on the data in the refresh zone in response to a value of the counter exceeding a threshold value.

9. The data storage device of claim 8, wherein the is one or more processing devices, individually or in combination, are further configured to reset the counter in response to performing the refresh operation.

10. The data storage device of claim 6, wherein the is one or more processing devices, individually or in combination, are further configured to reset the counter in response to a non-refresh write operation being performed in the refresh zone.

11. A method comprising:
maintaining, by one or more processing devices individually or in combination, a refresh monitor for a refresh zone of a magnetic medium of a disk drive, wherein the refresh zone comprises at least one data sector of at least one track of the magnetic medium;
determining, by the one or more processing devices individually or in combination and using a first damage estimator function, an amount of interference-based damage to data in the refresh zone based on a write operation;
updating, by the one or more processing devices individually or in combination, a counter of the refresh monitor based on the amount of interference-based damage;
determining, by the one or more processing devices individually or in combination and using a second damage estimator function different than the first damage estimator function, an amount of thermal-based damage to the data in the refresh zone based on a temperature of the magnetic medium or of the disk drive for a period of time;
updating, by the one or more processing devices individually or in combination, the counter of the refresh monitor based on the amount of thermal-based damage; and
executing, by the one or more processing devices individually or in combination, a refresh operation on the data in the refresh zone in response to a value of the counter exceeding a threshold value.

12. The method of claim 11, wherein the updating the counter of the refresh monitor based on the amount of interference-based damage is performed on an as-needed basis.

13. The method of claim 11, wherein the updating the counter of the refresh monitor based on the amount of thermal-based damage is performed at regular time intervals.

14. The method of claim 11, wherein:
the first damage estimator function is configured to determine the amount of interference-based damage; and
the second damage estimator function is configured to determine the amount of thermal-based damage.

15. The method of claim 14, wherein:
the first damage estimator function is further configured to quantify damage to the data in the refresh zone based on track interference caused by writing to another track; and
the second damage estimator function is further configured to quantify damage to the data in the refresh zone based on thermal decay.

16. The method of claim 11, further comprising resetting, by the one or more processing devices individually or in combination, the counter in response to a non-refresh write operation being performed in the refresh zone.

17. One or more processing devices comprising, individually or in combination:
means for maintaining a refresh monitor for a refresh zone of one disk of the one or more disks of a data storage device, wherein the refresh zone comprises at least one data sector;
means for updating the refresh monitor in response to a write operation being performed in a track different than a track containing the refresh zone;
means for updating the refresh monitor at predefined time intervals based on a temperature of the one disk or of the data storage device; and
means for performing a refresh operation of the refresh zone in response to a value of a counter exceeding a threshold value.

18. The one or more processing devices of claim 17, wherein:
the means for updating the refresh monitor in response to the write operation comprises means for updating the refresh monitor using a first damage estimator function configured to determine a first amount damage to the data in the refresh zone based on track interference caused by writing to another track; and
the means for updating the refresh monitor at predefined time intervals based on the temperature of the one disk or of the data storage device comprises means for updating the refresh monitor using a second damage estimator function configured to determine a second amount damage to the data in the refresh zone based on thermal decay.

19. The one or more processing devices of claim 18, wherein:
the means for updating the refresh monitor in response to the write operation comprises means for updating the counter based on the first amount of damage determined using the first damage estimator function; and
the means for updating the refresh monitor at predefined time intervals based on the temperature of the one disk or of the data storage device comprises means for updating the counter based on the second amount of damage determined using the second damage estimator function.

20. The one or more processing devices of claim 19, further comprising, individually or in combination, means to reset the counter in response to a non-refresh write operation being performed in the refresh zone.

21. The one or more processing devices of claim 18, further comprising, individually or in combination, means to normalize a scale of the second amount of damage to a scale of the first amount of damage.

* * * * *